United States Patent [19]

Heucher et al.

[11] Patent Number: 5,548,027
[45] Date of Patent: Aug. 20, 1996

[54] HOTMELT ADHESIVE

[75] Inventors: Reimar Heucher, Pulheim; Juergen Wichelhaus, Wuppertal; Kurt Schueller, Monheim; Siegfried Kopannia, Duesseldorf; Angela Rossini, Casarile, all of Germany

[73] Assignee: Henkel Kommanditgesellschaft auf Aktien, Duesseldorf, Germany

[21] Appl. No.: 307,854

[22] PCT Filed: Mar. 25, 1993

[86] PCT No.: PCT/EP93/00728

§ 371 Date: Oct. 13, 1994

§ 102(e) Date: Oct. 13, 1994

[87] PCT Pub. No.: WO93/20166

PCT Pub. Date: Oct. 14, 1993

[30] Foreign Application Priority Data

Apr. 3, 1992 [DE] Germany ............... 42 11 125.0

[51] Int. Cl.⁶ ................................................. C08L 77/08
[52] U.S. Cl. ............................................ 525/179; 524/505
[58] Field of Search ............................. 525/179; 524/505

[56] References Cited

U.S. PATENT DOCUMENTS

| | | | |
|---|---|---|---|
| 4,018,733 | 4/1977 | Lopez et al. | 525/183 |
| 4,552,819 | 11/1985 | Hibino | 428/516 |
| 4,725,641 | 4/1988 | Comert et al. | 524/499 |
| 4,791,164 | 12/1988 | Wichelhaus et al. | 524/514 |

FOREIGN PATENT DOCUMENTS

| | | |
|---|---|---|
| 0079178 | 5/1983 | European Pat. Off. |
| 0040926 | 10/1984 | European Pat. Off. |
| 0354521 | 2/1990 | European Pat. Off. |
| 2347799 | 9/1973 | Germany. |
| 3504804 | 8/1986 | Germany. |
| 5090575 | 10/1980 | Japan. |

OTHER PUBLICATIONS

R. F. Paschke, L. E. Peterson and D. H. Wheeler, Journal of the American Oil Chemists' Society, 41, 723 (1964).

*Primary Examiner*—Marion E. McCamish
*Attorney, Agent, or Firm*—Wayne C. Jaeschke; John Daniel Wood; Daniel S. Ortiz

[57] ABSTRACT

A hotmelt adhesive based on a number of components is provided. One of the components is at least one polyamide based on dimerized fatty acid, said polyamide being present in an amount by weight of the composition of at least 50%. Another component is from at least one ethylene copolymer selected from the group consisting of ethylene/vinyl acetate, ethylene/acrylate, said acrylate being derived from an alcohol containing 1 to 18 carbon atoms, and ethylene/methacrylate, said methacrylate being derived from an alcohol containing 1 to 18 carbon atoms, said ethylene copolymer being present in an amount by weight of the composition of 5 to 20%. Another component is at least one copolymer of styrene with one or more members selected from the group consisting of ethylene, isoprene and butylene, said copolymer of styrene being present in an amount by weight of the composition of 2 to 10%. Another component is at least one plasticizer, said plasticizer being present in an amount by weight of the composition of 5 to 25% by weight. Optional components are 0 to 10% by weight of at least one tackifying resin from the group consisting of polycyclopentadiene, polyterpene, liquid hydrocarbon resin and 0 to 15% by weight of at least one copolymer of monomers selected from the group consisting of ethylene, propylene, butylene and maleic anhydride.

24 Claims, No Drawings

HOTMELT ADHESIVE

BACKGROUND OF THE INVENTION

1. Field of the Invention

This invention relates to a hotmelt adhesive, to its production and use and to moldings produced with the hotmelt adhesive.

2. Discussion of Related Art

Hotmelt adhesives are adhesives solid at room temperature which are temporarily melted to perform their adhesive function. They are based essentially on polyamides, polyolefins or polyesters and mixtures thereof. By incorporation of additives, they can be further optimized for the particular applications envisaged.

Thus, a hotmelt adhesive for bonding non-pretreated polyethylene and copper in accordance with DE-OS 35 04 804 consists essentially of the following compatible components:

a) polyamides based on dimerized fatty acids, aliphatic amines and modifying additives, b) copolymers of ethylene, the inner anhydride of an ethylenically unsaturated dicarboxylic acid and optionally (meth)acrylates and/or vinyl esters and c) other auxiliaries such as, for example, compatibility promoters and tackifiers.

Although ethylene or propylene can be bonded with high strength values by compositions such as these without any need for the otherwise usual pretreatment and although the low-temperature properties are still remarkably good at −20° C. and lower, the known hotmelt adhesives have the following disadvantage: their softening points are too high, for example for the processing of shrunk articles. Softening points of <130° C. are generally required for this application.

EP-A1-0 040 926 also describes a hotmelt adhesive for bonding untreated polyethylene. This known hotmelt adhesive contains a) a polyamide based on one or more dimeric fatty acids, b) an ethylene/acrylic acid/butyl acrylate terpolymer containing free carboxyl groups and optionally c) an acrylic rubber preferably in the form of a copolymer of ethyl acrylate, butyl acrylate, methoxyethyl acrylate and ethoxyethyl acrylate.

The document in question does not provide any information on the viscosity and softening point of the hotmelt adhesive so that it may well be that the products described are unsuitable for certain applications, for example for the processing of shrunk articles. For adhesion to non-pretreated polyethylene, it is important to bear in mind that, in many cases, not only high strengths, but also a balanced ratio of adhesion to substrate surface/inner cohesion is required so that, besides high strength values, a cohesive fracture pattern is also obtained in peel tests. None of this is mentioned in EP-A1-0 040 926.

U.S. Pat. No. 4,552,819 describes a hotmelt adhesive for coating shrinkable moldings of polyethylene for the electrical industry, more particularly the cable industry, which contains the following components:

a) 5 to 30% by weight of a polyamide based on dimerized fatty acids with an amine value of 0.5 to 15, b) 50 to 90% by weight of an ethylene/vinyl acetate copolymer which is hydrolyzed according to the statement of invention, but not in the comparative tests, c) 5 to 30% by weight of a block copolymer of styrene/butadiene/styrene or styrene/isoprene/styrene and optionally d) tackifiers, such as terpene, terpene/phenol and alkylphenol resin.

This composition has the disadvantage that adhesion to non-pretreated polyethylene cannot be obtained. In addition, the softening points are too high.

Finally, EP-A1-0 079 178 describes a hotmelt adhesive for bonding non-pretreated polyethylene which has the following composition:

a) copolymer of ethylene and α,β-unsaturated carboxylic acid and/or an alkyl ester thereof and vinyl acetate where the copolymer does not contain any alkyl ester units, b) copolymer of ethylene and unsaturated carboxylic acid.

The composition may also contain thermoplastics, such as polyethylene for example. Compositions such as these have the disadvantage that they lack sufficient resistance to chemicals.

DE-OS 23 47 799 describes heat-resilient moldings of crosslinked polyethylene with at least one layer of a hotmelt adhesive of the following composition:

a) polyamide based on dimerized fatty acid, b) acidic ethylene copolymers with an acid value of around 3 to 80 and c) a tackifier, more particularly a polyketone resin.

This hotmelt adhesive has the disadvantage of inadequate adhesion to non-pretreated polyethylene.

DESCRIPTION OF THE INVENTION

This invention relates to a hotmelt adhesive comprising:

a) at least 50% by weight of at least one polyamide based on dimerized fatty acid, b) 5 to 20% by weight of at least one ethylene copolymer selected from the group consisting of ethylene/vinyl acetate, ethylene/acrylate, said acrylate being derived from an alcohol containing 1 to 18 carbon atoms, and ethylene/methacrylate, said methacrylate being derived from an alcohol containing 1 to 18 carbon atoms, c) 2 to 10% by weight of at least one copolymer of styrene with one or more members selected from the group consisting of ethylene, isoprene and butylene, d) 5 to 25% by weight of at least one plasticizer, e) 0 to 10% by weight of at least one tackifying resin from the group consisting of polycyclopentadiene, polyterpene, liquid hydrocarbon resin and f) 0 to 15% by weight of at least one copolymer of monomers selected from the group consisting of ethylene, propylene, butylene and maleic anhydride.

The problem addressed by the invention was to remedy the situation described above.

The invention is defined in the claims and lies essentially in the choice of the components listed.

DETAILED DESCRIPTION OF THE INVENTION

The hotmelt adhesive according to the invention contains at least 50% by weight of at least one polyamide based on dimerized fatty acid as its key component. "Dimerized fatty acids" are obtained by the coupling of unsaturated long-chain monobasic fatty acids, for example linolenic acid, oleic acid. It is a mixture of several isomers (see R. F.

Paschke, L. E. Peterson and D. H. Wheeler, Journal of the American Oil Chemist's Society, 41, 723 (1964). Trimers and other oligomers may of course also be present in small amounts. The acids have long been known and are commercially available.

The polyamides according to the invention preferably have the following composition:

up to 55 mole-% and, more particularly, 35 to 49.5 mole-% of dimerized fatty acid, up to 15 mole-% and, more particularly, 0.5 to 15 mole-% of at least one monomeric fatty acid containing 12 to 22 carbon atoms and up to 35 mole-% and, more particularly, 2 to 35 mole-% of at least one polyether diamine corresponding to the following general formula:

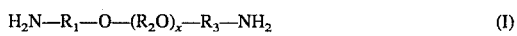

$$H_2N-R_1-O-(R_2O)_x-R_3-NH_2 \qquad (I)$$

x is a number of 8 to 80, mainly from 8 to 40, $R_1$ and $R_3$ may be the same or different and represent aliphatic and/or cycloaliphatic hydrocarbon radicals preferably containing 2 to 8 carbon atoms, $R_2$ is an optionally branched aliphatic hydrocarbon radical containing 1 to 6 carbon atoms, and up to 48 mole-% and, more particularly, 15 to 48 mole-% of at least one aliphatic and/or cycloaliphatic diamine containing 2 to 40 carbon atoms, up to two thirds of the dimerized fatty acids being replaceable by aliphatic dicarboxylic acids containing 4 to 12 carbon atoms.

Another favorable embodiment is characterized by the use of a polyamide obtained from:

up to 55 mole-% and, more particularly, 35 to 49.5 mole-% of dimerized fatty acid, up to 15 mole-% and, more particularly, 0.5 to 15 mole-% of at least one monomeric fatty acid containing 12 to 22 carbon atoms and up to 55 mole-% and, more particularly, 45 to 55 mole-% of at least one $C_{2-40}$ amine containing at least two primary and/or secondary amino groups, up to two thirds of the dimerized fatty acids being replaceable by aliphatic dicarboxylic acids containing 4 to 12 carbon atoms.

In addition, the polyamides used in accordance with the invention may contain other raw materials typically encountered in hotmelt adhesives. Thus, aliphatic dicarboxylic acids in particular are typical ingredients of hotmelts. Suitable aliphatic carboxylic acids preferably contain 4 to 12 carbon atoms. For example, glutaric acid, maleic acid, succinic acid, adipic acid, pimelic acid, suberic acid or even sebacic acid are suitable carboxylic acids. Up to two thirds of the molar quantity of the dimer fatty acid may be replaced by these acids. It is known to the expert in this regard that the melting point of polyamides can be increased within certain limits by addition of sebacic acid. Other possible raw materials for hotmelt adhesives are long-chain aminocarboxylic acids, such as 11-aminoundecanoic acid or even lauryl lactam. The polyamide raw materials known in fiber chemistry, such as caprolactam for example, may also be used in small quantities. These materials enable the expert to increase the melting point within certain limits.

So far as the amine components in the polyamides are concerned, it is pointed out that polyether polyols terminated by primary amino groups are preferred. Suitable amino-terminated polyether polyols are based on polyethylene glycol, polypropylene glycol or polytetrahydrofuran. Amino-terminated polyether polyols with little or no solubility in water are preferred. The amino-terminated polyether polyols used have molecular weights of 700 to 3,500 or even from 1,200 to 2,500. A particularly suitable class of raw materials are, for example, bis-(3-aminopropyl)-polytetrahydrofurans with a molecular weight of 700 to 3,500 and bis-(2-aminopropyl)-polyoxypropylenes with a molecular weight of 1,200 to 2,500. Primary linear alkylenediamines containing 2 to 10 carbon atoms, such as for example hexamethylenediamine, 1,3-diaminopropane, 1,4-diaminobutane, may also be used. Piperazine, tallow diamine and dipiperidyl propane are also suitable.

Another suitable class of diamines is derived from dimer fatty acids and contains primary amino groups instead of the carboxyl groups. Substances such as these are often called dimer diamines. They are obtained by nitrile formation from the dimerized fatty acids and subsequent hydrogenation.

The following observations apply to the molecular structure of the polyamides on which the compatible mixtures according to the invention are based. It is known to the expert in this field that monofunctional, difunctional and trifunctional raw materials have to be used in a certain ratio to obtain fusible, i.e. uncross-linked products. General specialist knowledge of polymer chemistry is relevant in this regard. Accordingly, in the event of crosslinking/gelation, formulations with no tendency towards gelation can be obtained by reducing the percentage content of trifunctional components (trimer fatty acids) and/or increasing the content of monofunctional amines or fatty acids. The molecular weight of the hotmelt adhesives according to the invention can best be calculated by terminal group titration of the terminal amino or acid groups via the molecular weight of the individual components. Preferred hotmelt adhesives according to the invention contain only one type of functional terminal groups, i.e. they are amines or carboxylic acids. For example, polyamides with a residual acid value have favorable properties. The residual acid value is in the range from 1 to 50, preferably in the range from 2 to 30 and more preferably in the range from 4 to 12. However, amino-terminated polyamides are preferred for many applications. They have amine values of 2 to 15 and preferably 4 to 10.

The "ethylene copolymer" component crucial to the invention may be a copolymer of ethylene and vinyl acetate. Copolymers such as these are known and are commercially available. They preferably contain 14 to 40% of vinyl acetate and have a melt index of 25 to 2,500.

Among copolymers of ethylene and acrylate or methacrylate, the following esters are of particular importance: methyl, ethyl, propyl, butyl, 2-ethylhexyl esters and esters with so-called fatty alcohols containing 12 to 18 carbon atoms which may even be unsaturated. The (meth)acrylate may even be partly replaced by esters of vinyl alcohol, for example vinyl acetate, or by vinyl esters of $C_{3-18}$ carboxylic acids. Up to 15 mole-% of the ethylene may be replaced by propylene. Ethylene copolymers of 80 to 90% by weight of ethylene and 10 to 20% by weight of (meth)acrylates are preferably used. In general, the ester is used in smaller quantities, the longer alcohol component. Their molecular weight (weight average) is preferably in the range from about 50,000 to 250,000. The copolymers of ethylene and (meth)acrylates are also known per se. They may be prepared in the usual way by radical polymerization.

The third key component is at least one copolymer of styrene with ethylene, isoprene and/or butylene. The copolymers in question are preferably thermoplastic elastomers of block polymers with styrene in the hard polymer segment and butadiene or isoprene and preferably ethylene and butylene in the soft polymer segments. Accordingly, the styrene-ethylene/butylene-styrene block polymer is preferred. It preferably has the following composition and properties: 14 to 29% of styrene; 71 to 86% of elastic components. By virtue of its two-phase structure, two glass transition temperatures are observed in contrast to statistical copolymers. Other advantages include high strength, high elasticity and high resilience and also flexibility at low temperatures. This component is also known per se and is commercially available. Substances which reduce the glass transition temperature, the elastic properties and hardness are used as plasticizers (plasticizing components). The plasticizer used is at least one substance from the classes of, for example, phthalic acid esters, hydroxycarboxylic acid esters and polymer plasticizers. Phthalic acid esters, hydroabietyl alcohol or polybutene are preferably used. The hydroabietyl alcohol is a high molecular weight primary alcohol of a hydrogenated colophony acid. It is commercially available under the name of Abitol from the Hercules company. The polybutene is an isobutylene/butene copolymer which is produced from generally high molecular weight monoolefins of low isoparaffin content. The phthalic acid esters are, for example, ULTRAMOLL PP (a phthalic acid polyester) or CELLOLYN 21 (a phthalate ester of technical hydroabietyl alcohol obtainable from Hercules).

In some cases, it has proved to be of advantage to add at least one tackifying resin. In the context of the invention, a "tackifying resin" is understood to be a resin which makes the composition tacky so that other articles adhere firmly to it after light pressure has been briefly applied. They themselves do not have to be tacky at room temperature. They generally have relatively low molecular weights of around 200 to 2,000 and a high non-uniformity. Substances belonging to the following classes are suitable: colophony and its derivatives and also petroleum resins, more particularly polycyclopentadiene, polyterpene and liquid hydrocarbon resin. Specific commercial products are, for example, SYN-THALAT DR 585-806 and TENREZ G 304 (triethylene glycol ester of colophony obtainable from Erbslöh), ABALYNE (a methyl ester of colophony obtainable from Hercules), HERCOLYN D and HERCOLYN DE (hydrogenated methyl esters of colophony obtainable from Hercules), PICCOVAR L 30 and L 60 (aromatic hydrocarbons obtainable from Hercules) and ESCOREZ 2520 (a liquid hydrocarbon obtainable from Exxon).

An addition of at least one copolymer of ethylene, propylene or butylene and/or maleic anhydride can also be of advantage. The hotmelt adhesive preferably contains 2 to 8% by weight of resin and 2.5 to 10% by weight of a copolymer of ethylene and maleic anhydride.

The composition according to the invention is a compatible polymer mixture. Mixtures are regarded as "compatible" if they appear homogeneous to the eye, i.e. consist of one phase, in the solid state and up to the processing temperature lying beyond the melting point. Physically, they are either true solutions or fine-particle dispersions of one polymer in a matrix of the other. An indication of homogeneity is the observation of only one glass temperature (Tg) in a DSC diagram (rate: 15° C./min.; second run; starting temperature: −120° C.; final temperature: 300° C.). If only one glass temperature is observed, the composition is always "homogeneous" in the context of the invention. However, several glass temperatures may also occur.

In addition to the constituents mentioned above, the adhesives according to the invention may contain other typical auxiliaries. Thus, antioxidants, light and heat stabilizers, fillers, pigments, preservatives or fungicides may be added in small quantities. These auxiliaries are typically added in a quantity of 0.5 to 2% by weight.

All percentages by weight are based on the final hotmelt adhesive.

The adhesive according to the invention has the following physical properties:

The hotmelt adhesives soften at temperatures in the range from 90° to 140° C. and preferably at temperatures in the range from 90° to 110° C. Their melt viscosities at 160° C. are mainly in the range from 10,000 to 180,000 mPa.s and preferably in the range from 20,000 to 100,000 mPa.s. Their heat resistance is generally above 60° C. and preferably above 80° C.

Although compatible mixtures of the components according to the invention are safely obtained in the claimed range, the expert may have to verify compatibility by simple preliminary tests in borderline cases. To this end, the constituents are melted with stirring in the intended mixing ratio. The melt is then cooled and observed to see whether any clouding occurs. If any separation occurs, the expert will either have to alter the ratio of polyamide to ethylene copolymer or will have to add more plasticizers, more particularly hydroabietyl alcohol or copolymers of styrene with ethylene, propylene and/or butylene, more particularly SEBS block polymers.

The hotmelt adhesive is preferably produced by mixing the plasticizer and the tackifying resin at 160° to 180° C. and then adding the styrene copolymer to and dissolving it in the resulting mixture. The ethylene copolymer, i.e. either the ethylene/vinyl acetate copolymer or the ethylene/(meth)acrylate copolymer, is then added and the mixture is homogenized. Finally, the polyamide and, lastly, the copolymer f) are added and the mixture is further homogenized at 190° C. The hotmelt adhesive according to the invention is generally applied from the melt by means of pumps and metering units.

The melt may be stored in containers or may be obtained by melting such molded articles as cylinders, filaments, wires or other profiles. Immediately after application of the liquid adhesive film, the surfaces to be bonded should be pressed gently together until the actual bond has been established.

In addition, it is of course possible to dissolve the new blends in suitable solvents and to apply them in this form to the surfaces to be bonded. In this case, a bondable state generally has to be established by application of heat. This applies in particular in cases where one of the two surfaces to be bonded is not permeable to the solvent used. Finally, the adhesive may also be applied in the form of a suitable aqueous dispersion and the actual bonding process may be carried out by application of heat after evaporation of the water.

The adhesives according to the invention are suitable for bonding a number of substrates. For example, they may be used to bond metals such as iron, aluminum or nickel, metal alloys, such as brass and, above all, copper which would otherwise be difficult to bond. The adhesives according to the invention may also be used to bond polar and non-polar plastics, for example polyvinyl chloride, polycarbonates, polymers. The hotmelt adhesives according to the invention are particularly suitable for bonding non-polar polymers and, more particularly, for bonding polyolefins, i.e. polyethylene, polypropylene and polybutylene and mixtures of these polymers, including copolymers thereof. An outstanding property of the systems according to the invention in this regard is that PVC and polyethylene or metals, particularly copper, lead and aluminum, can be bonded with high strengths without the usual pretreatment, the fracture patterns in peel strength tests all being cohesive. The PVC may even show a pronounced tendency towards the plasticizer migration.

"Without the otherwise usual pretreatment" does not mean the physical pretreatment, for example wiping with cloths or washing with solvents, but rather the chemical pretreatment, more particularly corona treatment and flame treatment. It is also emphasized that the individual components of the polymer mixtures are completely unsuitable on their own for establishing bonds of this type. The favorable low-temperature properties of the polymer blends according to the invention are also of particular importance. Thus, in the event of prolonged storage, no embrittlement was observed, even at temperatures of −40° C. or lower.

In addition, the viscosities and softening points lie in such ranges that a broad range of applications can be covered. Above all, the hotmelt adhesives according to the invention may also be used for co-extrusion with polyethylene or polypropylene.

By virtue of these positive properties, the hotmelt adhesives according to the invention are particularly suitable for bonding plastics and metals in the electrical industry and, in particular, for bonding cables and lines. Sleeves, end caps, conduits and tubes, above all of polyethylene, coated with hotmelt adhesives are used for this purpose. They shrink on heating and, at the same time, may become tacky. A very firm bond is thus established after cooling. Despite the different materials—some very difficult to bond, such as polyethylene and copper—the bond established is dependable in its strength and is capable of withstanding significant variations in temperature between −30° C. and +70° C. Other requirements, such as resistance to fungi and to rotting and non-corrosiveness, are also satisfied.

The invention is illustrated by the following Examples.

EXAMPLE 1

25 g of KRATON G 1652, a styrene/ethylene/butylene/styrene block copolymer (a product of Shell), are added in portions with stirring (double helical stirrer) over a period of 10 minutes at 160° to 180° C. to 120 g of ABITOL (hydroabietol, a Hercules product) and 50 g of ESCOREZ 2520 (liquid hydrocarbon resin, a product of Exxon). A clear solution was formed in 15 minutes. After addition of 150 g of ESCORENE UL 53019 CC (ethylene/vinyl acetate copolymer, a product of Exxon), the mixture was homogenized for 20–30 minutes at 180° to 190° C. 625 g of MACROMELT 6735 (thermoplastic polyamide, a product of Henkel KGaA) were then added over a period of 15 to 20 minutes. Finally, 30 g of EPOLENE C 16 (ethylene/maleic acid copolymer, a product of Eastman) were added over a period of 5 to 10 minutes. The whole was then stirred for 20 to 30 minutes at 190° C. The hotmelt adhesive obtained had a softening range of 90° to 100° C. and a melt viscosity of 15,000 to 25,000 mPa.s at 160° C. Its peel strength for vPE/vPE was 140 N/25 mm (angular peel test). The fracture showed 100% cohesive separation.

EXAMPLE 2

The test was carried out in the same way as in Example 1 with the following exception: 60 g of polybutene (a product of Amoco) were used instead of the 120 g of ABITOL and 685 g of MACROMELT 6735 were used instead of the 625 g. The hotmelt adhesive obtained had the same melting range but a melt viscosity of 40,000 mPa.s as opposed to 35,000 mPa.s and a higher peel strength of 220 N/25 mm. The fracture was again 100% cohesive.

Comparison test

A hotmelt adhesive was produced in the same way as in Example 1 except that no ABITOL or polybutene was added. A peel strength of 40 N/25 mm was obtained. The fracture pattern was adhesive.

The measurements were carried out as follows:
1. R & B (softening point)
   The softening point in °C. was measured by the ring & ball method (R & B) according to ASTM E-28.
2. Viscosity
   The viscosity in mPa.s was determined using a Brookfield thermocel RVT viscosimeter (spindle 27) at 160° C. or 210° C.
3. Peel strength
   Peel strength was measured by the T-peel test on non-pretreated crosslinked polyethylene films of extrudable 1 mm thick polymers used for cable manufacture.

Test specimens: 120–25 mm Overlap 50 mm

Bonding: A 1 mm thick polyamide blend film was positioned between the materials to be bonded which were then placed in a press for 5 minutes at 150° C./7 bar.

Conditioning: 24 h at 20° C./approx. 60% relative air humidity

Test: 20° C., 50 mm crosshead speed.
4. Heat resistance (internal Henkel test)
   Two 25.0 mm wide strips of flexible cardboard were bonded with a 25.0 mm overlap. The bond was subjected to a load of 13.5N (0.02N/mm$^2$) and exposed to a temperature increase of 5° C./10 mins. in a recirculating air drying cabinet. The heat resistance is the temperature at which the bond remains intact.

We claim:
1. A hotmelt adhesive comprising:
   a) at least 50% by weight of the hotmelt adhesive of at least one polyamide based on dimerized fatty acid having at least one value selected from the group consisting of amine values of from 2 to 15 and acid values of from 1 to 50;
   b) 5 to 20% by weight of the hotmelt adhesive of at least one copolymer of ethylene with at least one member selected from the group consisting of vinyl acetate, acrylate, said acrylate being derived from an alcohol containing 1 to 18 carbon atoms, methacrylate, said methacrylate being derived from an alcohol containing 1 to 18 carbon atoms and vinyl esters of $C_{3-18}$ carboxylic acids and copolymers wherein up to 15% of the ethylene in the copolymer is replaced by propylene;
   c) 2 to 10% by weight of the hotmelt adhesive of at least one copolymer of styrene with at least one member selected from the group consisting of ethylene, isoprene, butadiene and butylene; and
   d) 5 to 25% by weight of at least one plasticizer.
2. The hotmelt adhesive as claimed in claim 1 further comprising up to 10% by weight of the hotmelt adhesive of at least one tackifying resin selected from the group consisting of polycyclopentadiene, polyterpene and liquid hydrocarbon resin.
3. The hotmelt adhesive as claimed in claim 1 further comprising up to 15% by weight of the hotmelt adhesive of at least one copolymer of maleic anhydride and at least one monomer selected from the group consisting of ethylene, propylene and butylene.
4. The hotmelt adhesive as claimed in claim 1 wherein said polyamide comprises residues of (i) up to 55 mole-% of at least one member selected from the group consisting of dimerized fatty acid and a mixture of dimerized fatty acids and aliphatic dicarboxylic acids containing 4 to 12 carbon atoms, in a ratio not less than 1:2, (ii) up to 15 mole-% of at least one monomeric fatty acid containing 12 to 22 carbon atoms, (iii) up to 35 mole-% of at least one polyether diamine of the formula:

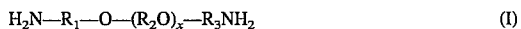

$$H_2N-R_1-O-(R_2O)_x-R_3NH_2 \quad (I)$$

wherein:

x is a number of 8 to 80, $R_1$ and $R_3$ may be the same or different and independently represent aliphatic and cycloaliphatic hydrocarbon groups, $R_2$ is a aliphatic hydrocarbon group containing 1 to 6 carbon atoms, and (iv) up to 48 mole-% of at least one aliphatic or cycloaliphatic diamine containing 2 to 40 carbon atoms.

5. The hotmelt adhesive as claimed in claim 4 wherein x is from 8 to 40, $R_1$ and $R_3$ each contain 2 to 8 carbon atoms, and $R_2$ is a branched aliphatic hydrocarbon radical, the amount of said dimerized fatty acid is from 35 to 39.5 mole-%, the amount of said monomeric fatty acid is from 0.5 to 15 mole-%, the amount of said polyether diamine is from 2 to 35 mole-%, and the amount of said aliphatic or cycloaliphatic diamine is from 15 to 48 mole-%.

6. The hotmelt adhesive as claimed in claim 1 wherein said polyamide comprises residues (i) up to 55 mole-% of at least one member selected from the group consisting of dimerized fatty acid, and a mixture of dimerized fatty acids and aliphatic dicarboxylic acids containing 4 to 12 carbon atoms in a ratio not less than 1:2, (ii) up to 15 mole % of at least one monomeric fatty acid containing 12 to 22 carbon atoms, and (iii) up to 55 mole % of at least one $C_{2-40}$ amine containing at least two amino groups independently selected from the group consisting of primary and/or secondary amino groups.

7. The hotmelt adhesive as claimed in claim 6 wherein the amount of said dimerized fatty acid is from 35 to 39.5 mole-%, the amount of said monomeric fatty acid is from 0.5 to 15 mole-%, and the amount of said $C_{2-40}$ amine is from 45 to 55 mole-%.

8. The hotmelt adhesive as claimed in claim 1 wherein said polyamide has an acid value of 2 to 30.

9. The hotmelt adhesive as claimed in claim 1 wherein said polyamide has an acid value of 4 to 12.

10. The hotmelt adhesive as claimed in claim 1 wherein said polyamide has an amine value of 4 to 10.

11. The hotmelt adhesive as claimed in claim 1 wherein said ethylene copolymer is an ethylene/vinyl acetate copolymer containing 14 to 40% of vinyl acetate.

12. The hotmelt adhesive as claimed in claim 1 wherein said copolymer of styrene comprises a block copolymer of styrene with at least one member selected from the group consisting of butadiene, isoprene, ethylene and butylene.

13. The hotmelt adhesive as claimed in claim 1 wherein said copolymer of styrene comprises a styrene/ethylene/butylene/styrene block copolymer.

14. The hotmelt adhesive as claimed in claim 1 wherein a tackifying resin is present in an amount of from 2 to 8% by weight of the hotmelt adhesive.

15. The hotmelt adhesive as claimed in claim 1 further comprising from 2.5 to 10% by weight of a copolymer of ethylene or propylene with maleic anhydride.

16. A method of bonding surfaces of substrates comprising applying to at least one of the surfaces to be bonded the hotmelt adhesive as claimed in claim 1.

17. The method as claimed in claim 16 wherein at least one of said surfaces is a non-pretreated polyethylene or a non-pretreated polyvinyl chloride surface.

18. The method as claimed in claim 16 wherein said at least one of said surfaces is polyvinyl chloride with a tendency for plasticizer migration.

19. The method as claimed in claim 16 wherein said at least one of said surfaces is a metal.

20. The method as claimed in claim 16 wherein said at least one of said surfaces is a member selected from the group consisting of copper, lead and aluminum.

21. A shrinkable molding coated on at least one side with the hotmelt adhesive as claimed in claim 1.

22. The shrinkable molding as claimed in claim 21 wherein said molding is based on crosslinked polyethylene or polypropylene.

23. A hotmelt adhesive comprising:

a) at least 50% by weight of the hotmelt adhesive of at least one polyamide based on dimerized fatty acid;

b) 5 to 20% by weight of the hotmelt adhesive of at least one ethylene copolymer selected from the group consisting of ethylene/vinyl acetate copolymer, ethylene/acrylate copolymer, said acrylate being derived from an alcohol containing 1 to 18 carbon atoms, and ethylene/methacrylate copolymer, said methacrylate being derived from an alcohol containing 1 to 18 carbon atoms;

c) 2 to 10% by weight of the hotmelt adhesive of at least one copolymer of styrene with at least one member selected from the group consisting of ethylene, isoprene and butylene;

d) 5 to 25% by weight of the hotmelt adhesive of at least one plasticizer;

e) up to 10% by weight of the hotmelt adhesive of at least one tackifying resin selected from the group consisting of polycyclopentadiene, polyterpene and, liquid hydrocarbon resin and f) up to 15% by weight of the hotmelt adhesive of at least one copolymer of monomers selected from the group consisting of ethylene, propylene, butylene and maleic anhydride.

24. A process for the production of a hotmelt adhesive as claimed in claim 23 comprising adding component c) to a mixture of components d) and e) and dissolving said component c) in said mixture of components d) and e), adding component b) to the resulting mixture of components c), d), and e) and homogenizing the resulting mixture of components b), c), d), and e) and, finally, adding components a) and f) to said mixture of components b), c), d), and e) and homogenizing the resulting mixture of components a), b), c), d), e), and f).

* * * * *